(12) United States Patent
Khatwa et al.

(10) Patent No.: US 11,275,388 B2
(45) Date of Patent: Mar. 15, 2022

(54) SYSTEMS AND METHODS FOR AN ENHANCED STABLE APPROACH MONITOR

(71) Applicant: HONEYWELL INTERNATIONAL INC., Morris Plains, NJ (US)

(72) Inventors: Ratan Khatwa, Sammamish, WA (US); Yasuo Ishihara, Kirkland, WA (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 783 days.

(21) Appl. No.: 16/189,228

(22) Filed: Nov. 13, 2018

(65) Prior Publication Data
US 2020/0150689 A1  May 14, 2020

(51) Int. Cl.
| | |
|---|---|
| G05D 1/06 | (2006.01) |
| G06F 16/29 | (2019.01) |
| B64D 45/04 | (2006.01) |
| G06F 9/54 | (2006.01) |
| G07C 5/08 | (2006.01) |

(Continued)

(52) U.S. Cl.
CPC .......... *G05D 1/0676* (2013.01); *B64D 45/04* (2013.01); *G06F 9/542* (2013.01); *G06F 16/29* (2019.01); *G07C 5/0816* (2013.01); *G08G 5/025* (2013.01); *H04W 4/023* (2013.01)

(58) Field of Classification Search
CPC ...... G05D 1/0676; B64D 45/04; G06F 9/542; G06F 16/29; G07C 5/0816; G08G 5/025; G08G 5/0021; H04W 4/023
See application file for complete search history.

(56) References Cited

U.S. PATENT DOCUMENTS

| | | | | |
|---|---|---|---|---|
| 3,786,505 A | * | 1/1974 | Rennie | G01C 23/00 342/33 |
| 4,368,517 A | * | 1/1983 | Lovering | G01C 23/005 340/972 |

(Continued)

FOREIGN PATENT DOCUMENTS

| | | |
|---|---|---|
| CN | 102968662 A | 3/2013 |
| EP | 3264393 A1 | 1/2018 |

OTHER PUBLICATIONS

Blajev, T., et al.; Go-Around Decision-Making and Execution Project; Final Report to Flight Safety Foundation; Mar. 2017.

(Continued)

*Primary Examiner* — Richard M Camby
(74) *Attorney, Agent, or Firm* — Lorenz & Kopf, LLP

(57) ABSTRACT

Alerting systems and methods for an enhanced approach monitor are provided. The system is configured to: determine a missed approach altitude (MAA), an intended configuration, and target approach speed, each being related to the intended approach procedure and aircraft specific data. At a decision point defined as a co-occurrence of (a) the RT distance is substantially equal to or less than a distance threshold, and (b) the RT altitude is substantially equal to the MAA, the system identifies go-around scenarios, such as when (i) the RT speed exceeds the target approach speed, or (ii) the RT configuration is not equal to the intended configuration, or (iii) an RT approach path angle exceeds the target angle. The system issues a go-around alert based on whether the aircraft can perform a go-around operation, as determined based on aircraft performance data and terrain data.

16 Claims, 4 Drawing Sheets

(51) Int. Cl.
*G08G 5/02* (2006.01)
*H04W 4/02* (2018.01)

(56) References Cited

U.S. PATENT DOCUMENTS

| | | | | |
|---|---|---|---|---|
| 8,170,727 | B2* | 5/2012 | Deker | G05D 1/0676 701/3 |
| 8,332,083 | B1* | 12/2012 | McCusker | G05D 1/0676 701/4 |
| 8,600,586 | B2 | 12/2013 | Ishihara et al. | |
| 9,499,279 | B2 | 11/2016 | He et al. | |
| 9,547,993 | B2 | 1/2017 | Khatwa et al. | |
| 9,934,692 | B2 | 4/2018 | Lacko et al. | |
| 10,577,123 | B1* | 3/2020 | Kirtz | G08G 5/0086 |
| 2004/0030465 | A1* | 2/2004 | Conner | G08G 5/0013 701/16 |
| 2004/0167685 | A1* | 8/2004 | Ryan | G08G 5/0086 701/16 |
| 2005/0015202 | A1* | 1/2005 | Poe | G08G 5/0008 701/301 |
| 2007/0120708 | A1 | 5/2007 | Ishihara et al. | |
| 2013/0304284 | A1 | 11/2013 | Kadavil et al. | |
| 2014/0225753 | A1 | 8/2014 | Conrardy et al. | |
| 2014/0257602 | A1 | 9/2014 | Gaston | |
| 2016/0041561 | A1* | 2/2016 | Davies | B64D 45/08 701/6 |
| 2016/0107766 | A1 | 4/2016 | He et al. | |
| 2017/0162066 | A1 | 6/2017 | Scacchi et al. | |
| 2017/0168658 | A1 | 6/2017 | Lacko et al. | |
| 2017/0301247 | A1 | 10/2017 | Sherry et al. | |
| 2018/0127111 | A1* | 5/2018 | Feyereisen | B64D 45/08 |
| 2018/0233056 | A1* | 8/2018 | Liberman | G01C 23/00 |
| 2018/0273200 | A1 | 9/2018 | De Villele et al. | |

OTHER PUBLICATIONS

Flight Safety Digest; Killers in Aviation: FSF Task Force Presents Facts About Approach-and-landing and Controlled-flight-into-terrain Accidents. Nov.-Dec. 1998; Jan.-Feb. 1999.

IFALPA The Global Voice of Pilots; Aircraft Design & Operation Briefing Leaflet; 16ADOBL02; Oct. 25, 2016, ©2016 The International Federation of Air Line Pilots' Associations.

Go-Around Execution; Loss of Control [[https://www.skybrary.aero/index.php/Category:Loss_of_Control]]; Flight Safety Foundation [[https://www.skybrary.aero/index.php/Flight_Safety_Foundation]]; EUROCONTROL [[https://www.skybrary.aero/index.php/EUROCONTROL]].

Flight Safety Foundation. Killers in Aviation: FSF Task Force Presents Facts About Approach-and- and Landing and Controlled-flight-into-terrain Accidents, Flight Safety Digest, vol. 18 No. 1-2, Feb. 1999.

Flight Safety Foundation. Go-Around Decision-Making and Execution Project, Final Report, Mar. 2017.

* cited by examiner

SYSTEMS AND METHODS FOR AN ENHANCED STABLE APPROACH MONITOR

TECHNICAL FIELD

The technical field generally relates to stable approach monitoring, and more particularly relates to systems and methods for alerting for an aircraft approaching a target runway.

BACKGROUND

The approach and landing flight phases continue to dominate aviation safety considerations. A stabilized approach to a target runway may generally be defined in established stabilized approach standard operating procedures that include minimum acceptable criteria, such as approach speed, approach angles, and equipment configuration. The pilot and/or flight crew monitors the aircraft's performance and configuration in comparison to the established stabilized approach standard operating procedures. When the aircraft approaching the target runway is not meeting the minimum acceptable criteria at a designated altitude, the pilot is expected to respond by performing a go-around operation.

The minimum acceptable criteria vary in detail, but the Flight Safety Foundation (FSF) stabilized approach criteria are the key international standards that were established in 1999. The FSF criteria generally state several altitudes for which the approach must be stabilized, where each altitude applies to a different approach scenario. Performing a go-around operation when required ensures that an aircraft is not approaching the target runway too fast, at too steep of an angle, arriving too high above a runway threshold, or not otherwise incorrectly configured for landing and deceleration.

In some instances, pilots believe that the go-around criteria for a stable approach are too conservative and may disregard indicators for the need to conduct a go-around; and, in some instances, land the aircraft without any negative consequences. Indeed, research has shown that there is a lower than expected compliance with stabilized approach standard operating procedures. Therefore, improved flight deck systems that provide go-around guidance that pilots trust and will result in increased compliance is a technical problem to address.

Accordingly, improved systems and methods for generating go-around alerts for the aircraft approaching the target runway are desirable. The desirable enhanced stable approach monitor is an alert system that utilizes aircraft-specific data in combination with approach procedure data and terrain data to generate and issue an enhanced go-around alert. The desirable alert system inspires greater compliance with go-around alerts due to its improved determinations. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is an alerting system for an aircraft approaching a target runway. The alerting system includes: a source of approach minimum/minima data including a target altitude; a source of an intended approach procedure; a source of real time (RT) aircraft state data including an RT location, an RT altitude and an RT speed; a source of aircraft specific data including RT configuration data and respective performance data; a source of terrain data; and a control module operationally coupled to the source of approach minimum/minima data, the source of the intended approach procedure, the source of RT aircraft state data, the source of aircraft specific data, and the source of terrain data, the control module configured to: determine a missed approach altitude (MAA), corresponding target angle, an intended configuration, and target approach speed, each being related to the intended approach procedure and aircraft specific data; upon determining that the RT altitude is substantially equal to the MAA, or a RT distance is less than or equal to a distance threshold, identify each of the following situations as a go-around scenario: (i) when the RT speed exceeds the target approach speed, (ii) when the RT configuration is not equal to the intended configuration, and (iii) when an RT approach path angle exceeds the target angle; and upon recognizing the occurrence of a go-around scenario, determine when (i) the RT speed exceeds the target approach speed, or (ii) the RT configuration is not equal to the intended configuration, or (iii) an RT approach path angle exceeds the target angle; and determine whether the aircraft can perform a go-around operation based at least in part upon the aircraft performance data and the terrain data; and issue a go-around alert when the aircraft can perform the go-around operation; and prevent a go-around alert when the aircraft cannot perform the go-around operation.

Also provided is a method for alerting for an aircraft approaching a target runway, including: at a control module comprising a processor and a memory, receiving, from a source of approach minimum data, a target altitude; receiving, from a flight management system (FMS), an intended approach procedure; receiving, from a navigation system, real time (RT) aircraft state data including an RT location, an RT altitude and an RT speed; receiving from an avionics system, RT configuration data; receiving aircraft specific data including configuration data and respective performance data; receiving terrain data from a terrain database; determining a missed approach altitude (MAA), corresponding target angle, an intended configuration, and target approach speed, each being related to the intended approach procedure and aircraft specific data; upon determining that the RT altitude is substantially equal to the MAA, or a RT distance is less than or equal to a distance threshold, identify each of the following situations as a go-around scenario: (i) when the RT speed exceeds the target approach speed, (ii) when the RT configuration is not equal to the intended configuration, and (iii) when an RT approach path angle exceeds the target angle; and upon recognizing the occurrence of a go-around scenario, determine when (i) the RT speed exceeds the target approach speed, or (ii) the RT configuration is not equal to the intended configuration, or (iii) an RT approach path angle exceeds the target angle; and determining whether the aircraft can perform a go-around operation based at least in part upon the aircraft performance data and the terrain data; and issuing a go-around alert when the aircraft can perform the go-around operation; and preventing a go-around alert when the aircraft cannot perform the go-around operation.

An enhanced approach monitor is also provided. The enhanced approach monitor includes: a source of approach minimum data including a target altitude; a source of an intended approach procedure; a source of real time (RT) aircraft state data including an RT location, an RT altitude and an RT speed; a source of aircraft specific data including RT configuration data and respective performance data; a source of terrain data; and a control module operationally coupled to the source of approach minimum data, the source of the intended approach procedure, the source of RT aircraft state data, the source of aircraft specific data, and the source of terrain data, the control module configured to: determine a missed approach altitude (MAA), corresponding target angle, an intended configuration, and target approach speed, each being related to the intended approach procedure and aircraft specific data; upon determining that the RT altitude is substantially equal to the MAA, or a RT distance is less than or equal to a distance threshold, identify each of the following situations as a go-around scenario: (i) when the RT speed exceeds the target approach speed, (ii) when the RT configuration is not equal to the intended configuration, and (iii) when an RT approach path angle exceeds the target angle; and upon recognizing the occurrence of a go-around scenario, determine when (i) the RT speed exceeds the target approach speed, or (ii) the RT configuration is not equal to the intended configuration, or (iii) an RT approach path angle exceeds the target angle; and determine whether the aircraft can perform a go-around operation based at least in part upon the aircraft performance data and the terrain data; and issue a go-around alert when the aircraft can perform the go-around operation; and prevent a go-around alert when the aircraft cannot perform the go-around operation; and a display system operationally coupled to the control module, and wherein: the control module is further configured to issue the go-around alert by generating display commands for the display system to render symbology on an image; and the display system is configured to render the symbology, responsive to the display commands.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, responding to a go-around alert by performing a go-around operation, ensures that a pilot is not approaching the target runway too fast, at too steep of an angle, arriving too high above a runway threshold, or not otherwise incorrectly configured for landing and deceleration. Since research has shown that there is a lower than expected compliance with stabilized approach criteria for go-arounds, a technical problem presented is the enhanced generation of go-around alert that pilots trust and will promote increased compliance. Exemplary embodiments provide a technical solution to this problem in the form of a control module (FIG. 1, 104) embodying novel rules that combine and convert existing approach procedure data, approach minimums data, aircraft specific data, and terrain data to generate and issue go-around alerts. The figures and descriptions below provide more detail.

Figure 1:
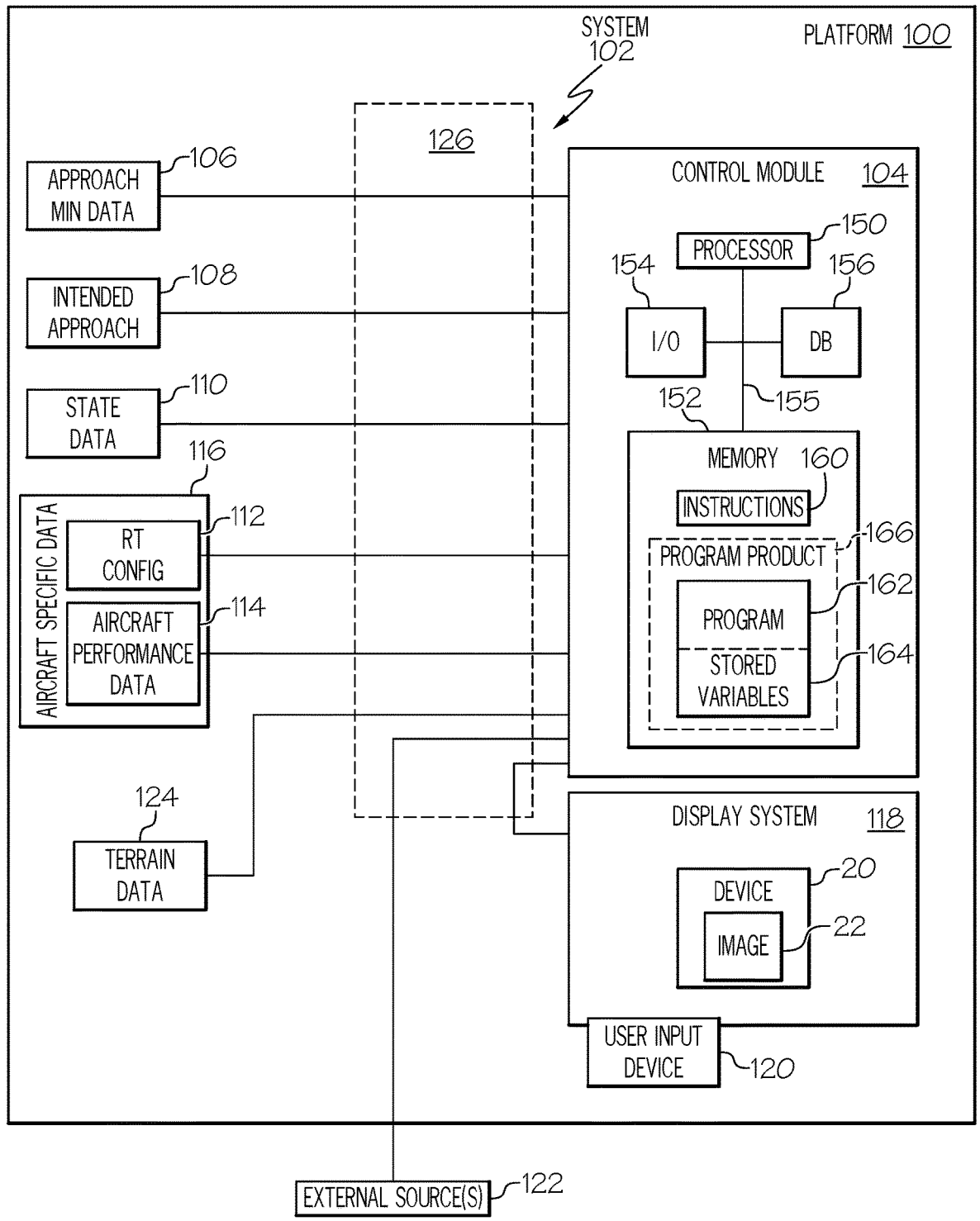
FIG. 1 is a block diagram of alerting system for an aircraft approaching a target runway, in accordance with an exemplary embodiment.

Turning now to FIG. 1, in an embodiment, the alerting system 102 for an aircraft approaching a target runway (also referred to herein as an enhanced approach monitor, and as "system" 102) is generally associated with a mobile platform 100. In various embodiments, the mobile platform 100 is an aircraft, and is referred to as aircraft 100. The system 102 embodies a control module 104. Although the control module 104 is shown as an independent functional block, onboard the aircraft 100, in some embodiments, the control module 104 is integrated within a preexisting mobile platform management system, avionics system, cockpit display system (CDS), flight controls system (FCS), or aircraft flight management system (FMS). In some embodiments, the control module 104, user input device 120, and display system 118 are configured as a control display unit (CDU). In other embodiments, the control module 104 may exist in an electronic flight bag (EFB) or portable electronic device (PED), such as a tablet, cellular phone, or the like. In embodiments in which the control module is within an EFB or a PED, the display system 118 and user input device 120 may also be part of the EFB or PED.

The control module 104 may be operationally coupled to any combination of the following aircraft systems, which are generally on-board systems: a source of approach minimum data 106, a source of an intended approach procedure 108; a source of real time (RT) aircraft state data 110; a source of RT configuration data 112; a source of aircraft specific data 116; a source of terrain data 124; a display system 118; and, a user input device 120. In various embodiments, a communication system and fabric 126 may reside onboard and operationally couple various on-board systems and external sources 122 to the control module 104. The functions of these aircraft systems, and their interaction, are described in more detail below.

The intended approach procedure 108 may be a selection based on processing information from a variety of sources. In various embodiments, the intended approach procedure 108 may be provided by a flight management system (FMS), in communication with a navigation database. In other embodiments, the intended approach procedure 108 may be provided by a user input device 120. Examples of approach procedures include precision approaches and non-precision approaches including instrument landing system (ILS) procedures, circling approaches, and the like. Each approach procedure has a published approach minimum data 106.

The approach minimum data 106 may be part of a series of intended geospatial midpoints between a cruise altitude and a landing, in addition to intended performance data associated with each of the geospatial midpoints (non-limiting examples of the performance data include intended navigation data, such as: intended airspeed, intended altitude, intended acceleration, intended flight path angle, and the like). In various embodiments, the source of the approach minimum data 106 is a navigation database (NavDB). The NavDB is a storage location that may also maintain a database of flight plans, and/or information regarding terrain and airports and/or other potential landing locations (or destinations) for the aircraft 100. The approach minimum data 106 includes a target altitude that may be variously referred to as a decision height (DH), a decision altitude (DA), a missed approach point (MAP), and the like. Pilots are trained to use and understand the published approach minimum data 106. In some embodiments, the target altitude is based on data from a barometric altimeter reference bug, which the control module 104 processes with novel rules (program 162) to generate the target altitude.

Real-time (RT) aircraft state data may include any of: an instantaneous location (e.g., the latitude, longitude, orientation), an instantaneous track (i.e., the direction the aircraft is traveling in relative to some reference), a RT flight path angle, a RT vertical speed, a RT ground speed, a RT instantaneous altitude (or height above ground level), and a current phase of flight of the aircraft 100. As used herein, "real-time" is interchangeable with current, instantaneous, and actual (as opposed to intended). In some embodiments, the RT aircraft state data is generated by a navigation system. The source of aircraft state data 110 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. Aircraft state data is sometimes referred to as navigation data. In various embodiments, the RT aircraft state data is made available by way of the communication system and fabric 126, so other components, such as the control module 104 and the display system 118, may further process and/or handle the aircraft state data.

Aircraft specific data 116 generally includes, for aircraft 100, data that is specific to components and systems; such as, an inventory of components, settings of components, performance ratings of components, and the like. For example, aircraft specific data may include the type of engine on the aircraft 100, its available thrust levels and performance rating at respective thrust levels, its performance in reverse thrust, its age, its maintenance history, and the like. In another example, aircraft specific data may include the type of flaps on the aircraft 100, the number of configurations supported by the flaps, and the performance rating for each of the configurations.

Aircraft specific data further includes aircraft RT configuration data 112 and aircraft performance data 114. Aircraft RT configuration data 112 constitutes a current or real-time configuration or setting for each of various on-board avionics systems. Specific to this disclosure, are the aircraft flaps, landing gear and engine and, at any given time, their combined status or settings may be referred to as RT aircraft configuration data. During operation, each of the various avionics systems self-report or provide respective real-time (RT) performance data and sensed data for further processing. Therefore, examples of the aircraft performance data 114 include: RT engine thrust level, RT flap configuration, RT braking status/setting, and the like. As may be appreciated, each of the on-board avionics systems may therefore include a variety of on-board detection sensors and may be operationally coupled to the control module 104, central management computer, or FMS.

Over time, the aircraft 100 accumulates a performance history. Aircraft 100 performance data 114 may include historical stopping and deceleration distance data as related to various configurations, weight, and the age or wear of aircraft components. In various embodiments, Aircraft performance data 114 may include historical approach performance data for various aircraft configurations. Aircraft performance data 114 may be stored in a database onboard the aircraft or may be provided via an eternal source 122. In various embodiments, the source of aircraft specific data 116 and aircraft performance data 114 is the same, and may be external of the aircraft 100, and may further be updated remotely. When a go-around scenario has been identified, the control module 104 may reference and process aircraft performance data 114 and terrain data 124 in addition to processing RT state data 110 and RT configuration data in order to determine whether determine whether the aircraft 100 can perform a respective go-around operation.

Terrain data 124 includes topographical information for the airport and surrounding environment. A source of terrain data 124 may be a terrain database or an enhanced ground proximity warning system (EGPWS) terrain database. External sources 122 may also communicate with the aircraft 100 and the control module 104. External sources may include or provide: notices to airmen (NOTAM), traffic data system(s); air traffic control (ATC); and a variety of other radio inputs, such as source(s) of the radio signals used by the an instrument landing system (ILS), and weather and surface data sources, such as a source for meteorological terminal aviation weather reports (METARS), automatic terminal information service (ATIS), datalink ATIS (D-ATIS), automatic surface observing system (ASOS).

In various embodiments, communication between aircraft 100 subsystems is managed by a communication system and fabric 126. The communication system and fabric 126 is configured to support instantaneous (i.e., real time or current) communications between onboard systems (i.e., the navigation system, the navigation database, the various avionics systems, the FMS), the control module 104, and the one or more external data source(s) 122. As a functional block, the communication system and fabric 126 may represent one or more transmitters, receivers, and the supporting communications hardware and software required for components of the system 102 to communicate as described herein. In various embodiments, the communication system and fabric 126 may have additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communication system and fabric 126 also support controller pilot data link communications (CPDLC), such as through an aircraft communication addressing and reporting system (ACARS) router; in various embodiments, this feature may be referred to as a communications management unit (CMU) or communications management function (CMF). In summary, the communication system and fabric 126 may allow the aircraft 100 and the control module 104 to receive information that would otherwise be unavailable to the pilot and/or co-pilot using only the onboard systems.

The user input device 120 and the control module 104 are cooperatively configured to allow a user (e.g., a pilot, co-pilot, or crew member) to interact with display devices 20 in the display system 118 and/or other elements of the system 102, as described in greater detail below. Depending on the embodiment, the user input device 120 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 120 is configured as a touchpad or touchscreen, it may be integrated with the display system 118. As used herein, the user input device 120 may be used to modify or upload the program product 166, override the program when it's running, etc. In various embodiments, the display system 118 and user input device 120 are onboard the aircraft 100 and are also operationally coupled to the communication system and fabric 126.

In various embodiments, the control module 104, alone, or as part of a central management computer (CMS) or a flight management system (FMS), executes instructions 160 and thereby draws upon data and information from a navigation system and a NavDB to provide real-time flight guidance for aircraft 100. The real time flight guidance may be provided to a user by way of commands for the display system 118, an audio system, or the like. For example, the control module 104 may compare an instantaneous (actual) position and heading of the aircraft 100 with the prescribed or intended flight plan data for the aircraft 100 and generate display commands to render images 22 showing these features. The control module 104 may further associate a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the navigation plan for the aircraft 100.

The control module 104 generates display commands for the display system 118 to cause the display device 20 to render thereon the image 22, comprising various graphical user interface elements, tables, icons, alerts, menus, buttons, and pictorial images, as described herein. The display system 118 is configured to continuously receive and process the display commands from the control module 104. The display system 118 includes a display device 20 for presenting an image 22. In various embodiments described herein, the display system 118 includes a synthetic vision system (SVS), and the image 22 is a SVS image. In exemplary embodiments, the display device 20 is realized on one or more electronic display devices configured as any combination of: a head up display (HUD), an alphanumeric display, a vertical situation display (VSD) and a lateral navigation display (ND).

Renderings on the display system 118 may be processed by a graphics system, components of which may be integrated into the display system 118 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. In an embodiment, the Bokeh effect is used for emphasizing relevant signage with respect to remaining signage. The control module 104 may be said to display various images and selectable options described herein. In practice, this may mean that the control module 104 generates display commands, and, responsive to receiving the display commands from the control module 104, the display system 118 displays, renders, or otherwise visually conveys on the display device 20, the graphical images associated with operation of the aircraft 100, and specifically, the graphical images as directed by the control module 104.

In various embodiments, the source of terrain data 124 additionally includes a runway awareness and advisory system (RAAS) database and an Aerodrome Mapping Database (AMDB). In various embodiments, each of these may include an airport features database, having therein maps and geometries, including runway records with corresponding runway threshold locations. The AMDB may also include airport status data for the runways and/or taxi paths at the airport; the airport status data indicating operational status and directional information for the taxi paths (or portions thereof).

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as a computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Information in the memory 152 may be organized and/or imported from an external data source 50 during an initialization step of a process; it may also be programmed via a user input device 120. In some embodiments, the database 156 is part of the memory 152. In some embodiments, the airport features data, the terrain data 124, and the aircraft specific data 116 are pre-loaded into the memory 152 or the database 156, and are, therefore, internal to the control module 104.

The novel program 162 includes rules and instructions which, when executed, convert the processor 150/memory 152/database 156 configuration into the novel control module 104, which is a novel "aircraft approaching a target runway alerting" control module that performs the functions, techniques, and processing tasks associated with the operation of the system 102. Novel program 162 and associated stored variables 164 may be stored in a functional form on computer readable media, for example, as depicted, in memory 152. While the depicted exemplary embodiment is described in the context of a fully functioning computer system, those skilled in the art will recognize that the mechanisms of the present disclosure are capable of being distributed as a program product 166. As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 126. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 126 and obtains data from external data source(s) directly. Also, in various embodiments, the I/O interface 154 may support communication with technicians, and/or one or more storage interfaces for direct connection to storage apparatuses, such as the database 156.

During operation, the processor 150 loads and executes one or more programs, algorithms and rules embodied as instructions and applications 160 contained within the memory 152 and, as such, controls the general operation of the control module 104 as well as the system 102. In executing the process described herein, the processor 150 specifically loads the instructions embodied in the program 162, thereby being programmed with program 162. During execution of program 162, the processor 150, the memory 152, and a database DB 156 form a novel dynamic processing engine that performs the processing activities of the system 102.

Figure 2:
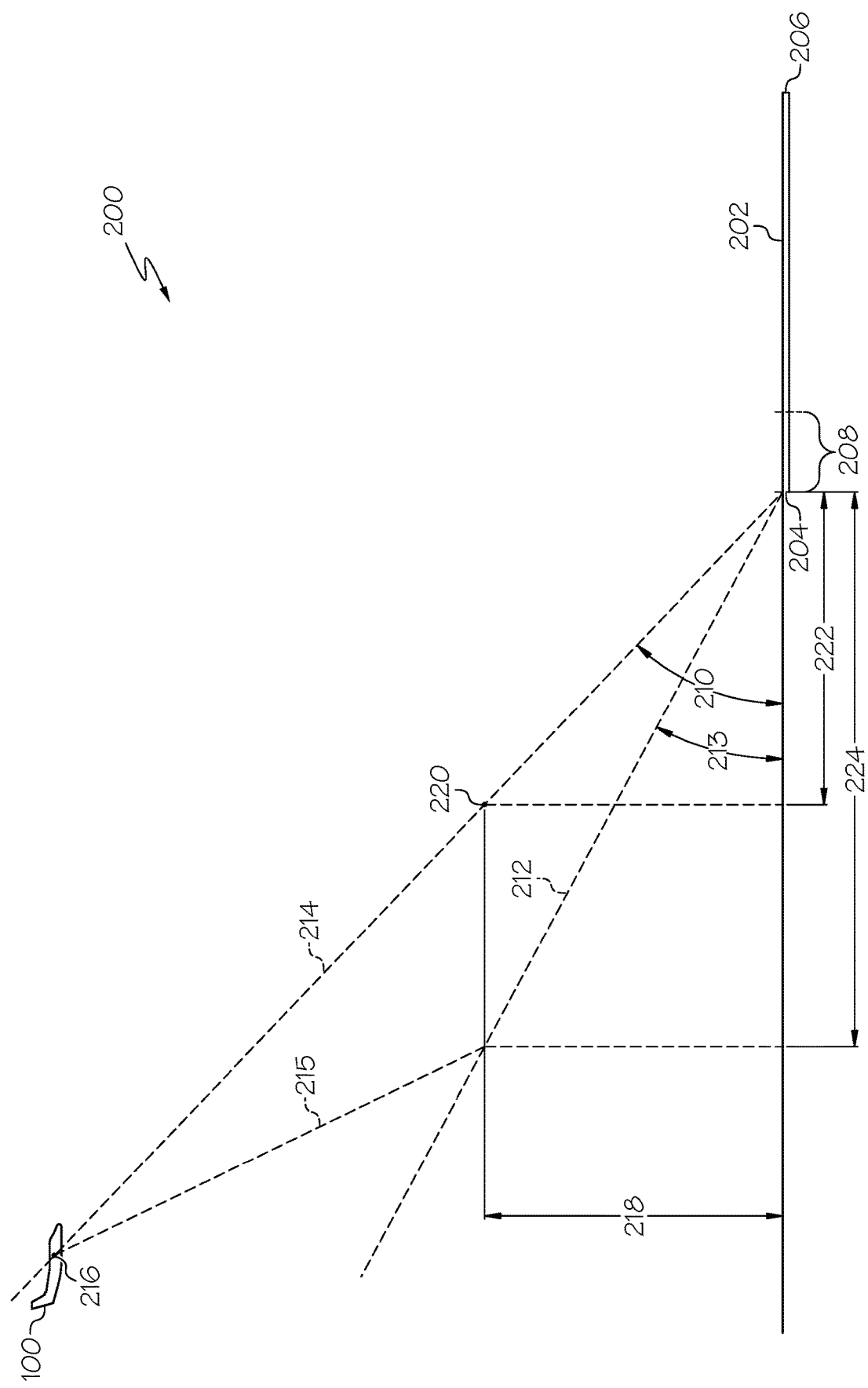
FIG. 2 is an illustration depicting an application for the alerting system for an aircraft approaching a target runway, in accordance with an exemplary embodiment.

An example of an approach scenario is shown in FIG. 2. In illustration 200, the aircraft 100 is approaching a runway 202. Runway 202 is demarked with entry 204, exit 206, and touchdown zone 208 that begins at the entry 204 and extends toward the exit 206. Aircraft 100 is initially on an approach trajectory 214. In operation of the present enhanced approach monitor (system 102), the control module 104 references an intended approach procedure 108, generally from a NavDB, which provides a missed approach altitude (MAA 218), corresponding target angle 213, an intended configuration, and a target approach speed. In the example, the intended approach procedure includes reaching the MAA 218 with an intended approach angle 213, which occurs at a distance threshold 224. In an embodiment, the distance threshold 224 is 1 mile. The system 102 references or determines these values and then constructs a trajectory 212 of intended values for the aircraft 100 to take to the runway 202 while meeting stabilized flight criteria.

In the example shown in FIG. 2, from location 216, the aircraft 100 is on the descent path 214, at RT angle 210; on its current trajectory, the aircraft 100 will reach the MAA 218, at a distance 222 from the entry 204 of the runway 202, the location that this occurs is demarked location 220 however, as described above, aircraft 100 should reach the MAA 218 ready to follow the descent path 212 at target angle 213, have the intended configuration, and be traveling at the target approach speed. A suitable correction for the aircraft 100 may be to correct along potential path 215 to arrive at the MAA 218 meeting intended objectives.

The control module 104 continuously receives and processes a variety of inputs from the components to which it is operationally coupled. While descending from a location 216 toward the MAA 218, the control module 104 continually compares the RT values to respective intended and constructed values, as described in more detail connection with FIG. 4, method 400. The control module 104 continually determines a RT distance between the aircraft 100 and the runway threshold of the target runway, based on the RT location data.

The control module 104 determines when the aircraft 100 is substantially at the MAA 218, and when the RT distance between the aircraft 100 and the runway threshold is less than or equal to a distance threshold. When either the aircraft 100 is at the MAA 218 or the RT distance is less than or equal to the distance threshold 224, the aircraft 100 is in position for descent to the runway 202, at which time the system 102 recognizes whether or not a go-around scenario is underway (also referred to as "recognizing the occurrence of a go-around scenario," and an unstable scenario). As used herein, substantially means plus or minus 5%, but it may be a pre-programmed or calculated value that is aircraft specific, runway specific, or part of standard operating procedures for a selected approach operation.

The control module 104 identifies each of the following situations, individually, or in combination, as a go-around scenario: (i) when the RT speed exceeds the target approach speed, (ii) when the RT configuration is not equal to the intended configuration, and (iii) when an RT approach path angle exceeds the target angle. Said differently, once the aircraft 100 has descended to the MAA 218 or it is less than or equal to the distance threshold 224 from the runway threshold, responsive to the occurrence of (i) or (ii) or (iii) individually, and responsive to the occurrence of any combination of (i), (ii), and (iii), the control module 104 recognizes that a go-around scenario is occurring.

When a go-around scenario is recognized, the control module 104 determines whether to issue an alert. In some scenarios, the aircraft 100 may be unable to perform a respective go-around operation. For example, the aircraft 100 may be unable to outclimb terrain if a go-around operation is initiated beyond a published Missed Approach Point (MAP); for example, if the MAP has been determined with safe obstacle clearance along a missed approach course. When the aircraft is unable to perform a go-around operation responsive to the recognized go-around scenario, the system 102 prevents issuance of a go-around alert to avoid an unsafe go-around operation. In various embodiments, the display system 118 additionally highlights the terrain that it has been determined that the aircraft 100 may be unable to outclimb ("concerning terrain") in a respective go-around operation. The control module 104 may determine this by processing aircraft performance data 114 and terrain data 124, such as, from an enhanced ground proximity warning system (EGPWS) terrain database, or a "terrain sensitive" MAP in the navigation database. When the aircraft 100 can perform the go-around operation the control module 104 issues commands for a go-around alert. When the aircraft 100 cannot perform the go-around operation, the control module 104 prevents issuance of a go-around alert.

Figure 3:
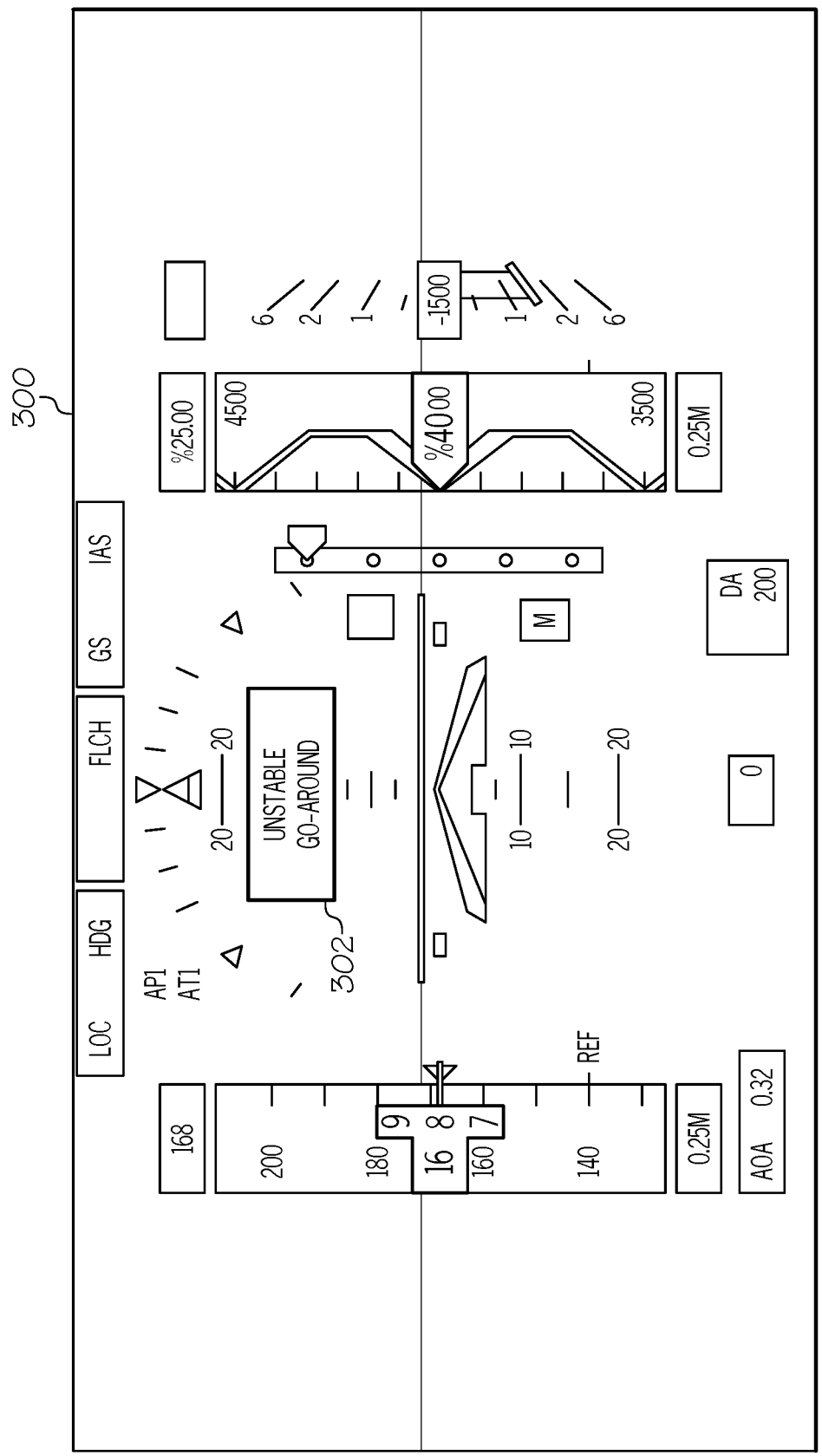
FIG. 3 is an image as may be found on a display system, showing a go-around alert, in accordance with an exemplary embodiment.

Alerts may be issued in multiple ways. In an embodiment, the control module 104 issues the go-around alert by generating commands for the display system 118 to render symbols, icons, or alphanumeric information on an image 22, and the display system 118 is configured to render the symbols, icons, or alphanumeric information responsive to the display commands. In FIG. 3, an image 300, such as may be found on a primary flight display, shows an unstable go-around alert 302 that comprises text in a text box that is placed in the middle of the displayed image. In various embodiments, the text box may be a highlighted color or shaded with respect to the remainder of the display. In an embodiment, the primary flight display integrates a synthetic vision display, and any concerning terrain that the system 102 has determined that the aircraft 100 may be unable to outclimb in a respective go-around operation is rendered in a visually distinct manner with respect to remaining terrain, for example, by highlighting the concerning terrain in red and rendering it in an alternative texture pattern from the remaining terrain on a displayed image 22. The concerning terrain may be rendered similarly on other flight deck displays that present terrain, e.g. a MAP, a HUD and a vertical situation display.

Figure 4:
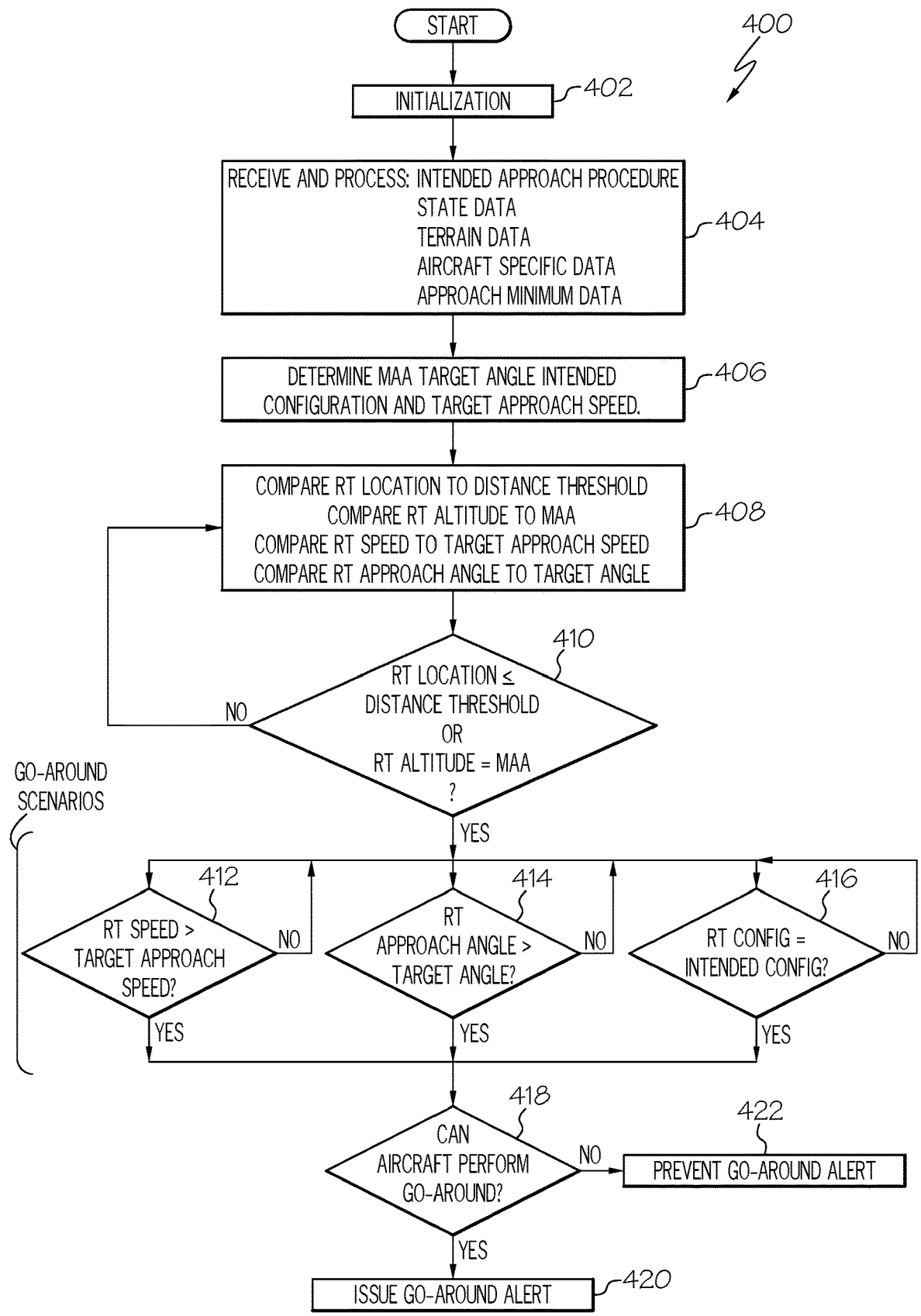
FIG. 4 is a flow chart for a method for alerting for an aircraft approaching a target runway, in accordance with an exemplary embodiment.

The system 102 may make its determinations and selections in accordance with a method such as method 400 of FIG. 4. With continued reference to FIGS. 1-4, a flow chart is provided for a method 400 for providing a system 102, in accordance with various exemplary embodiments. Method 400 represents various embodiments of a method for selecting an accurate runway record. For illustrative purposes, the following description of method 400 may refer to elements mentioned above in connection with FIG. 1. In practice, portions of method 400 may be performed by different components of the described system. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 if the intended overall functionality remains intact.

The method starts, and at 402 the control module 104 is initialized and the system 102 is in operation. Initialization may comprise uploading or updating instructions and applications 160, program 162, and various lookup tables, such as the problematic scenarios listing, stored in the database 156. Stored variables may include, for example, configurable, predetermined distances thresholds, predetermined angle thresholds, predetermined amounts of time to use as time-thresholds for neighbor traffic, parameters for setting up a user interface, and the various shapes, various colors and/or visually distinguishing techniques used for icons and alerts. In some embodiments, program 162 includes additional instructions and rules for rendering information differently based on type of display device in display system 118. Initialization at 402 may also include identifying external sources and/or external signals and the communication protocols to use with each of them.

At 404 the inputs are received, and the method begins to continually process them. As mentioned above, the inputs include an intended approach procedure 108, aircraft state data 110, terrain data 124, aircraft specific data 116 (which includes RT configuration data 112 and aircraft performance data 114), and the approach minimum data including the target altitude.

At 406 the method 400 determines the MAA, target angle, a target approach speed, and an intended configuration to accomplish these targets. At 408, the method 400 begins a continuous comparison of the RT location to a retrieved pre-programmed variable, the distance threshold 224, the RT altitude to the MAA, the RT speed to the target approach speed, and the RT approach angle to the target angle.

At 410, upon the occurrence of (a) the RT distance of the aircraft 100 is substantially equal to the distance threshold 224, or (b) the RT altitude of the aircraft 100 is substantially the MAA 218, the aircraft is at a decision point. The method 400 evaluates various go-around scenarios of 412, 414, and 418. As these comparisons were already underway from step 408, moving through 412, 414, and 418 is essentially in parallel. The go-around scenarios include: at 412, whether RT speed is greater than the target approach speed, at 414, whether the RT approach angle is greater than the target angle, and at 418, whether the RT configuration is not equal to the intended configuration.

If any of 412, 414, and 418 are true, at least one go-around scenario has been identified, and the method 400 determines whether the aircraft 100 can perform a go-around operation based on the terrain data 124 and aircraft performance data 114. Only upon identifying at least one go-around scenario at 412, 414, or 418, and determining that the aircraft can perform the go-around operation at 418, does the method 400 issue a go-around alert at 420. If the aircraft 100 cannot perform the go-around operation at 418, the method 400 prevents the issuance of the go-around alert at 422. The method 400 may continue until the aircraft 100 has landed or received an override command from a user.

Thus, technologically improved alerting systems and methods for an aircraft 100 approaching a target runway are provided. As is readily appreciated, the above examples of the system 102 are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An alerting system for an aircraft approaching a target runway, comprising:
   a source of approach minimum/minima data including a target altitude;
   a source of an intended approach procedure;
   a source of real time (RT) aircraft state data including an RT location, an RT altitude and an RT speed;
   a source of aircraft specific data including RT configuration data and respective performance data;
   a source of terrain data; and
   a control module operationally coupled to the source of approach minimum/minima data, the source of the intended approach procedure, the source of RT aircraft state data, the source of aircraft specific data, and the source of terrain data, the control module configured to:
   determine a missed approach altitude (MAA), corresponding target angle, an intended configuration, and target approach speed, each being related to the intended approach procedure and aircraft specific data;
   upon determining that the RT altitude is substantially equal to the MAA, or a RT distance is less than or equal to a distance threshold,
   identify each of the following situations as a go-around scenario: (i) when the RT speed exceeds the target approach speed, (ii) when the RT configuration is not equal to the intended configuration, and (iii) when an RT approach path angle exceeds the target angle; and
   upon recognizing a go-around scenario, determine whether the aircraft can perform a go-around operation based at least in part upon the aircraft performance data and the terrain data; and
   issue a go-around alert when the aircraft can perform the go-around operation; and prevent a go-around alert when the aircraft cannot perform the go-around operation.

2. The alerting system of claim 1, further comprising a display system operationally coupled to the control module, and wherein:
the control module is further configured to issue the go-around alert by generating display commands for the display system to render symbology on an image; and
the display system is configured to render the symbology, responsive to the display commands.

3. The alerting system of claim 1, wherein, when the aircraft cannot perform the go-around operation, the display system is further configured to render terrain that the aircraft may be unable to outclimb in a respective go-around operation in a visually distinct manner with respect to remaining terrain.

4. The alerting system of claim 1, wherein the intended approach procedure is an instrument landing or a circling approach.

5. The alerting system of claim 4, wherein the intended approach procedure is a precision approach.

6. The alerting system of claim 4, wherein the intended approach procedure is a non-precision approach.

7. The alerting system of claim 1, wherein the source of the approach minimum data is a navigation database.

8. The alerting system of claim 1, wherein the source of the approach minimum data is barometric altimeter or radio altitude reference bug data.

9. The alerting system of claim 1, wherein the source of the intended approach procedure is a flight management system (FMS) or electronic chart system.

10. The alerting system of claim 1, wherein substantially means plus or minus 5 percent.

11. The alerting system of claim 1, wherein the source of aircraft specific data is external of the aircraft and updated remotely.

12. The alerting system of claim 1, further comprising a user input device, and wherein the control module is further configured to receive a user override command, subsequent to issuing the go-around alert, and cease the issuance of the go-around alert responsive thereto.

13. A method for alerting for an aircraft approaching a target runway, comprising:
at a control module comprising a processor and a memory,
receiving, from a source of approach minimum data, a target altitude;
receiving, from a flight management system (FMS), an intended approach procedure;
receiving, from a navigation system, real time (RT) aircraft state data including an RT location, an RT altitude and an RT speed;
receiving from an avionics system, RT configuration data;
receiving aircraft specific data including configuration data and respective performance data;
receiving terrain data from a terrain database;
determining a missed approach altitude (MAA), corresponding target angle, an intended configuration, and target approach speed, each being related to the intended approach procedure and aircraft specific data;
upon determining that there is (a) an occurrence of the RT altitude is substantially equal to the MAA, or (b) a RT distance of less than or equal to a distance threshold,
identify each of the following situations as a go-around scenario: (i) when the RT speed exceeds the target approach speed, (ii) when the RT configuration is not equal to the intended configuration, and (iii) when an RT approach path angle exceeds the target angle; and
upon recognizing the occurrence of a go-around scenario, determining whether the aircraft can perform a go-around operation based at least in part upon the aircraft performance data and the terrain data; and
issuing a go-around alert when the aircraft can perform the go-around operation; and
preventing a go-around alert when the aircraft cannot perform the go-around operation.

14. The method of claim 13, further comprising:
generating display commands for a display system to render symbology on an image; and
rendering the symbology on the display system, responsive to the display commands.

15. The method of claim 14, further comprising
receiving a user override command, subsequent to issuing the go-around alert; and
ceasing the issuance of the go-around alert responsive thereto.

16. An enhanced approach monitor, comprising:
a source of approach minimum data including a target altitude;
a source of an intended approach procedure;
a source of real time (RT) aircraft state data including an RT location, an RT altitude and an RT speed;
a source of aircraft specific data including RT configuration data and respective performance data;
a source of terrain data; and
a control module operationally coupled to the source of approach minimum data, the source of the intended approach procedure, the source of RT aircraft state data, the source of aircraft specific data, and the source of terrain data, the control module configured to:
determine a missed approach altitude (MAA), corresponding target angle, an intended configuration, and target approach speed, each being related to the intended approach procedure and aircraft specific data;
upon determining that the RT altitude is substantially equal to the MAA, or a RT distance is less than or equal to a distance threshold,
identify each of the following situations as a go-around scenario: (i) when the RT speed exceeds the target approach speed, (ii) when the RT configuration is not equal to the intended configuration, and (iii) when an RT approach path angle exceeds the target angle; and
upon recognizing the occurrence of a go-around scenario, determine whether the aircraft can perform a go-around operation based at least in part upon the aircraft performance data and the terrain data; and
issue a go-around alert when the aircraft can perform the go-around operation; and
prevent a go-around alert when the aircraft cannot perform the go-around operation; and
a display system operationally coupled to the control module, and wherein:
the control module is further configured to issue the go-around alert by generating display commands for the display system to render symbology on an image; and
the display system is configured to render the symbology, responsive to the display commands.

* * * * *